(12) United States Patent
Kudou et al.

(10) Patent No.: US 9,925,913 B2
(45) Date of Patent: Mar. 27, 2018

(54) TRACTOR HEADLIGHT DEVICE

(71) Applicant: YANMAR CO., LTD., Osaka-shi, Osaka (JP)

(72) Inventors: Junko Kudou, Osaka (JP); Yoshiaki Kurokawa, Osaka (JP)

(73) Assignee: YANMAR CO., LTD., Osaka-Shi, Osaka (JP)

( * ) Notice: Subject to any disclaimer, the term of this patent is extended or adjusted under 35 U.S.C. 154(b) by 0 days.

(21) Appl. No.: 15/315,109

(22) PCT Filed: May 27, 2015

(86) PCT No.: PCT/JP2015/065177
§ 371 (c)(1),
(2) Date: Nov. 30, 2016

(87) PCT Pub. No.: WO2015/182637
PCT Pub. Date: Dec. 3, 2015

(65) Prior Publication Data
US 2017/0190278 A1    Jul. 6, 2017

(30) Foreign Application Priority Data
May 30, 2014   (JP) ................................ 2014-113555

(51) Int. Cl.
*B60Q 1/00* (2006.01)
*B60Q 1/04* (2006.01)
*F21S 8/10* (2006.01)

(52) U.S. Cl.
CPC .............. *B60Q 1/0458* (2013.01); *F21S 8/10* (2013.01); *F21S 48/10* (2013.01); *B60Q 1/04* (2013.01);
(Continued)

(58) Field of Classification Search
CPC ................................... B60Q 1/04; F21S 48/10
(Continued)

(56) References Cited

U.S. PATENT DOCUMENTS 6,821,006 B2    11/2004   Shikiya
7,033,053 B2*   4/2006   Watson ................ B60Q 1/0683
                                                        362/507
(Continued)

FOREIGN PATENT DOCUMENTS

DE          20309082 U1    10/2003
FR          557511 A        8/1923
(Continued)

OTHER PUBLICATIONS

International Search Report corresponding to Application No. PCT/JP2015/065177; dated Aug. 11, 2015, with English translation.
(Continued)

*Primary Examiner* — Thuy Vinh Tran
(74) *Attorney, Agent, or Firm* — Cantor Colburn LLP

(57) ABSTRACT

A tractor headlight device according to the present invention is configured from a pair of high-beam units and a pair of low-beam units, wherein the high-beam units and the low-beam units are respectively disposed at top and bottom. High-beam lamp lenses configuring the high-beam units are formed extending from the front to the sides of a hood. Low-beam lamp lenses configuring the low-beam units are formed along a front grill under the high-beam units.

15 Claims, 19 Drawing Sheets

(52) U.S. Cl.
    CPC ....... *B60Q 1/0408* (2013.01); *B60Y 2200/221* (2013.01)

(58) Field of Classification Search
    USPC .................................. 315/82; 362/487, 507
    See application file for complete search history.

(56) References Cited

U.S. PATENT DOCUMENTS

| | | | |
|---|---|---|---|
| 7,784,955 B2 * | 8/2010 | Choi ................... | B60Q 1/0683 362/37 |
| 8,444,306 B2 * | 5/2013 | Hanson ................ | B60Q 1/0047 362/184 |
| 8,847,492 B2 * | 9/2014 | Nakadate ................ | B60Q 1/08 315/82 |
| 2003/0012033 A1 | 1/2003 | Shikiya et al. | |
| 2014/0070569 A1 | 3/2014 | Schmitz et al. | |
| 2016/0185275 A1 | 6/2016 | Kawashiri et al. | |

FOREIGN PATENT DOCUMENTS

| | | |
|---|---|---|
| GB | 1326601 A | 8/1973 |
| GB | 2097909 A | 11/1982 |
| JP | 2002293188 A | 10/2002 |
| JP | 2003007106 A | 1/2003 |
| JP | 2006315571 A | 11/2006 |
| JP | 2007137236 A | 6/2007 |
| JP | 2010163036 A | 7/2010 |
| JP | 2013047034 A | 3/2013 |
| JP | 2014010958 A | 1/2014 |
| JP | 2015024692 A | 2/2015 |
| WO | 2011010199 A1 | 1/2011 |

OTHER PUBLICATIONS

Extended European Search Report corresponding to Application No 15799385.8-1762/3162632 PCT/JP2015065177; dated Dec. 21, 2017.

\* cited by examiner

Fig. 19
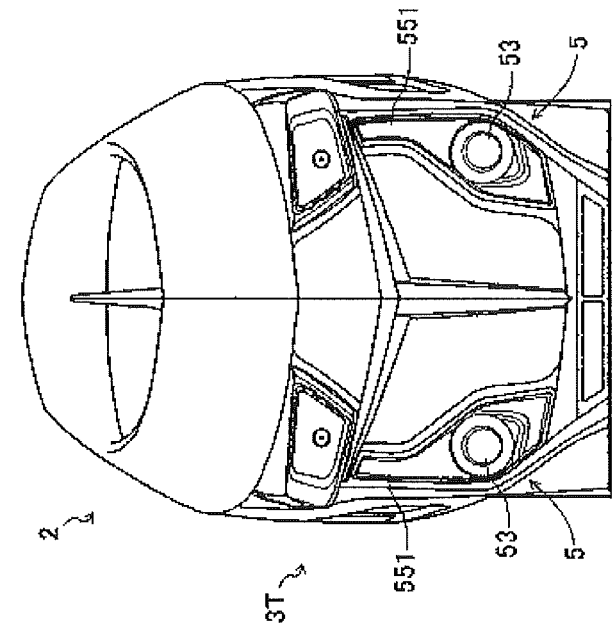
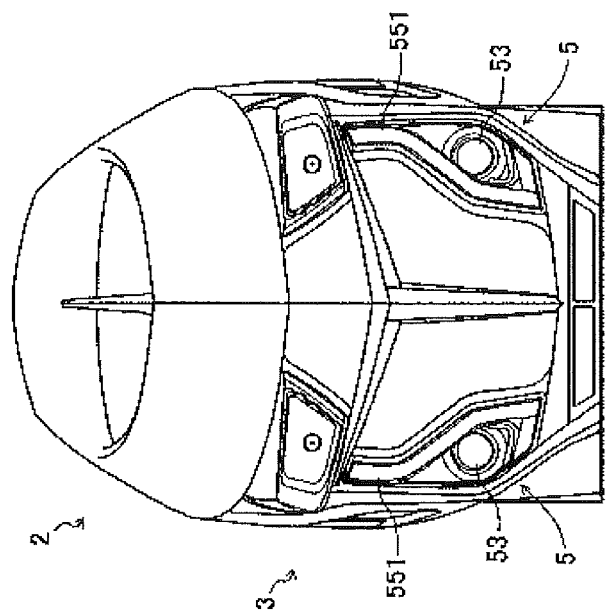

TRACTOR HEADLIGHT DEVICE

This is the U.S. national stage of application No. PCT/JP2015/065177, filed on May 27, 2015. Priority under 35 U.S.C. § 119(a) and 35 U.S.C. § 365(b) is claimed from Japanese Application No. 2014-113555, filed May 30, 2014, the disclosure of which is also incorporated herein by reference.

TECHNICAL FIELD

The present invention relates to a headlight device of a tractor.

BACKGROUND ART

Conventionally, a tractor used in farmland is known (for example, see the Patent Literature 1). In a front part of the tractor, a bonnet is provided, and an engine is housed in the bonnet. In a front surface of the bonnet, a headlight device is arranged.

The tractor has a characteristic that the bonnet is long and slender and a front surface area of the bonnet is small. In the tractor, a large front grill is provided in a front surface of the bonnet so as to take air in an inside of the bonnet. Accordingly, the headlight device of the tractor must be made small and cannot make a strong impression on a third person even when the headlight device is turned on. As a result, there is a problem that visibility by the third person is low. Accordingly, an art which can make a strong impression on a third person so as to improve visibility is desired.

PRIOR ART REFERENCE

Patent Literature

Patent Literature 1: the Japanese Patent Laid Open Gazette 2010-163036

DISCLOSURE OF INVENTION

Problems to be Solved by the Invention

The purpose of the present invention is to provide an art which can make a strong impression on a third person so as to improve visibility.

Means for Solving the Problems

The first mode of the present invention is a headlight device of a tractor including a pair of high-beam units, and a pair of low-beam units, wherein the high-beam units and the low-beam units are arranged respectively at upper and lower sides.

The second mode of the present invention is the headlight device according to the first mode wherein the high-beam unit includes a high-beam lamp, a high-beam lamp housing supporting the high-beam lamp, and a high-beam lamp lens covering the high-beam lamp, and the high-beam lamp lens is formed from a front surface to a side surface of a bonnet.

The third mode of the present invention is the headlight device according to the second mode wherein the high-beam lamp lens is formed so as to be projected from the side surface of the bonnet.

The fourth mode of the present invention is the headlight device according to the third mode wherein the high-beam unit includes a reflector reflecting light of the high-beam lamp, and an inner casing covering the reflector, and the inner casing is projected from the side surface of the bonnet and formed along an inner surface of the high-beam lamp lens.

The fifth mode of the present invention is the headlight device according to the fourth mode wherein glossy plating is applied to an outer surface of the inner casing opposite to the high-beam lamp lens.

The sixth mode of the present invention is the headlight device according to the first mode wherein the low-beam unit includes a low-beam lamp, a low-beam lamp housing supporting the low-beam lamp, and a low-beam lamp lens covering the low-beam lamp, and the low-beam lamp lens is formed along a front grill below the high-beam unit.

The seventh mode of the present invention is the headlight device according to the sixth mode wherein the low-beam unit has one or more illumination lamps, and the illumination lamp highlights a zone along an outline of the low-beam lamp lens.

The eighth mode of the present invention is the headlight device according to the seventh mode wherein the illumination lamps are turned on following turning on of a work lamp and turned off following turning off of the work lamp.

The ninth mode of the present invention is the headlight device according to one of first to eighth modes wherein the high-beam unit and the low-beam unit are connected to each other via a bracket.

The tenth mode of the present invention is a tractor including the headlight device according to one of first to ninth modes.

The eleventh mode of the present invention is a tractor including the headlight device according to one of first to ninth modes, and a symbol mark arranged at a center of the headlight device.

Effect of the Invention

The present invention brings the following effects.

According to the first mode of the present invention, the headlight device of the tractor according to the application includes the pair of the high-beam units, and the pair of the low-beam units, wherein the high-beam units and the low-beam units are arranged respectively at the upper and lower sides.

Accordingly, in the tractor having the headlight device, an illumination part in the front surface of the bonnet (a part which can emit light) has upper and lower two stages. Accordingly, the tractor can make a strong impression on a third person so as to improve visibility.

According to the second mode of the present invention, the high-beam unit includes the high-beam lamp, the high-beam lamp housing supporting the high-beam lamp, and the high-beam lamp lens covering the high-beam lamp. The high-beam lamp lens is formed from the front surface to the side surface of the bonnet. Accordingly, in the tractor having the headlight device, an illumination part which is extended laterally can be secured from the front surface to the side surface of the bonnet. Therefore, the tractor can make a strong impression on a third person so as to improve visibility.

According to the third mode of the present invention, the high-beam lamp lens is formed so as to be projected from the side surface of the bonnet. Accordingly, the tractor having the headlight device can illuminate by light emitted from an upper surface and a lower surface of the high-beam lamp lens. Therefore, the tractor can make a strong impression on a third person so as to improve visibility.

According to the fourth mode of the present invention, the high-beam unit includes the reflector reflecting light of the high-beam lamp, and the inner casing covering the reflector. The inner casing is projected from the side surface of the bonnet and formed along the inner surface of the high-beam lamp lens. Accordingly, in the tractor having the headlight device, the high-beam lamp lens constituting the side surface of the bonnet can be made bright substantially uniformly. Therefore, the tractor can make a strong impression on a third person so as to improve visibility.

According to the fifth mode of the present invention, glossy plating is applied to the outer surface of the inner casing opposite to the high-beam lamp lens. Accordingly, in the tractor having the headlight device, the high-beam lamp lens constituting the side surface of the bonnet can be made bright substantially uniformly further. Therefore, the tractor can make a strong impression on a third person so as to improve visibility.

According to the sixth mode of the present invention, the low-beam unit includes the low-beam lamp, the low-beam lamp housing supporting the low-beam lamp, and the low-beam lamp lens covering the low-beam lamp. The low-beam lamp lens is formed along the front grill below the high-beam unit. Accordingly, in the tractor having the headlight device, an illumination part (a part which can emit light) which is extended longitudinally can be secured below the high-beam unit. Therefore, the tractor can make a strong impression on a third person so as to improve visibility.

According to the seventh mode of the present invention, the low-beam unit has one or more illumination lamps. The illumination lamp highlights the zone along the outline of the low-beam lamp lens. Accordingly, in the tractor having the headlight device, the outline of the low-beam lamp lens extended longitudinally can be emphasized. Therefore, the tractor can make a strong impression on a third person so as to improve visibility.

According to the eighth mode of the present invention, the illumination lamps are turned on following turning on of the work lamp and turned off following turning off of the work lamp. Accordingly, in the tractor having the headlight device, appearance of the low-beam lamp lens is changed corresponding to a driving state. Therefore, the tractor can make a strong impression on a third person so as to improve visibility.

According to the ninth mode of the present invention, the high-beam unit and the low-beam unit are connected to each other via a bracket. Accordingly, in the tractor having the headlight device, the one high-beam unit and the one low-beam unit is configured integrally. Therefore, assembly processes of the tractor can be simplified so as to improve production efficiency.

According to the tenth mode of the present invention, the tractor has the headlight device according to one of first to ninth modes. Accordingly, the tractor can make a strong impression on a third person so as to improve visibility.

According to the eleventh mode of the present invention, the tractor has the headlight device according to one of first to ninth modes, and the symbol mark arranged at the center of the headlight device. Accordingly, the tractor can make a strong impression on a third person so as to improve visibility.

BRIEF DESCRIPTION OF DRAWINGS

FIG. 16 is a drawing of a state in which an illumination lamp is turned on.
FIG. 19 is a drawing of a headlight device according to a third embodiment.

DETAILED DESCRIPTION OF THE INVENTION

Technical thought of the present invention can be used for all agricultural machine vehicles and construction machine vehicles.

Firstly, a tractor 1 is explained.

Figure 1:
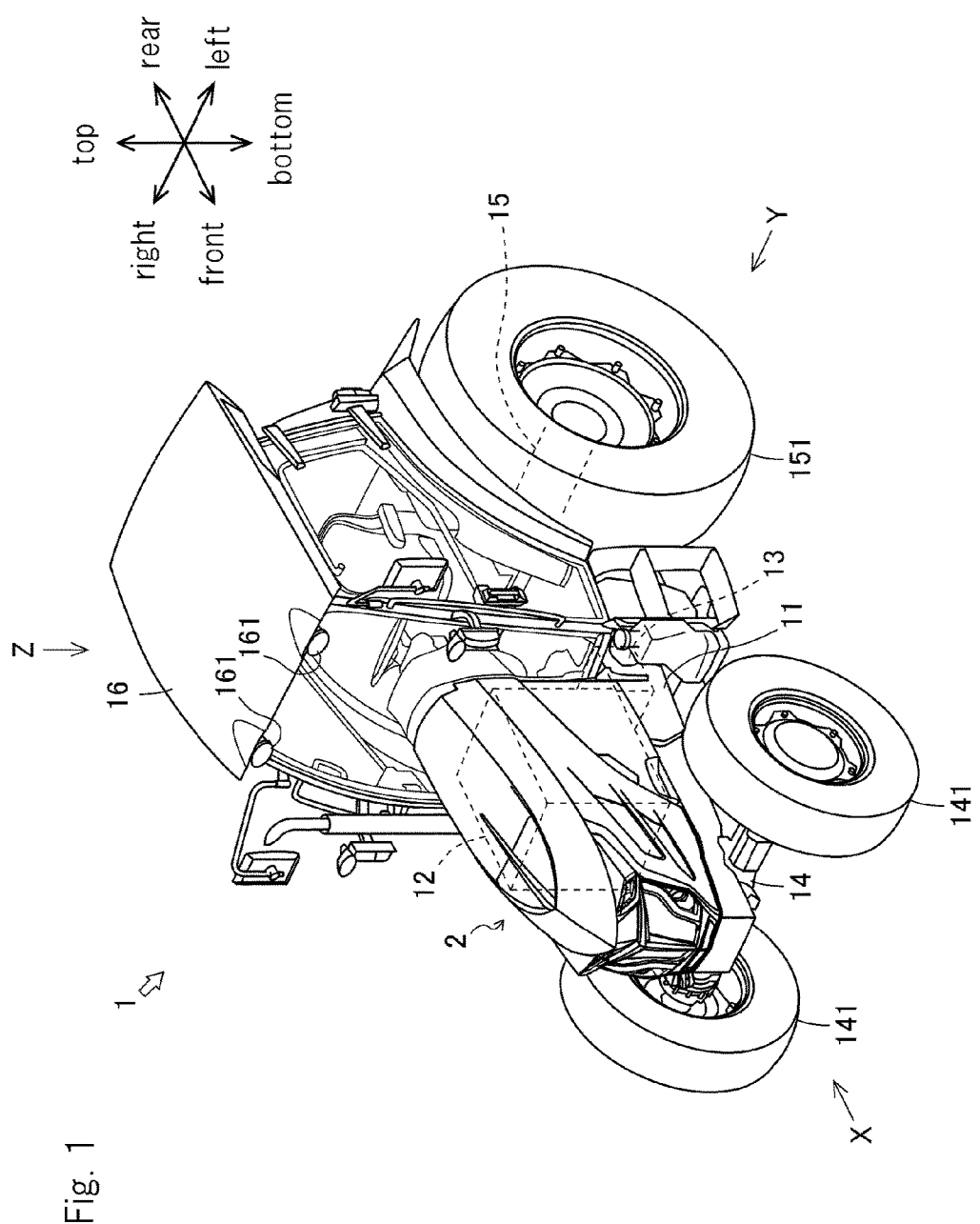
FIG. 1 is a drawing of a tractor.
Figure 2:
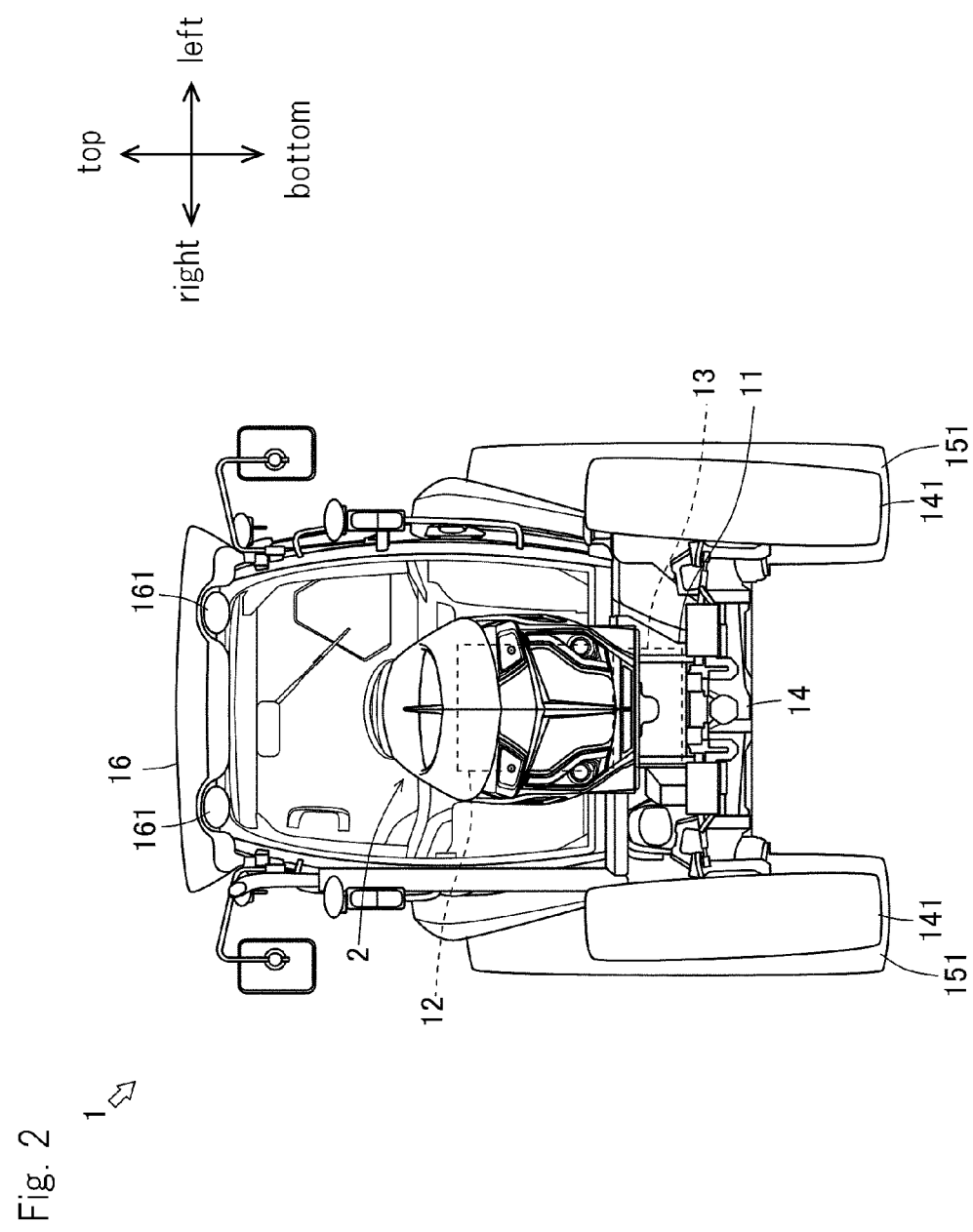
FIG. 2 is a drawing from a direction of an arrow X in FIG. 1.
Figure 3:
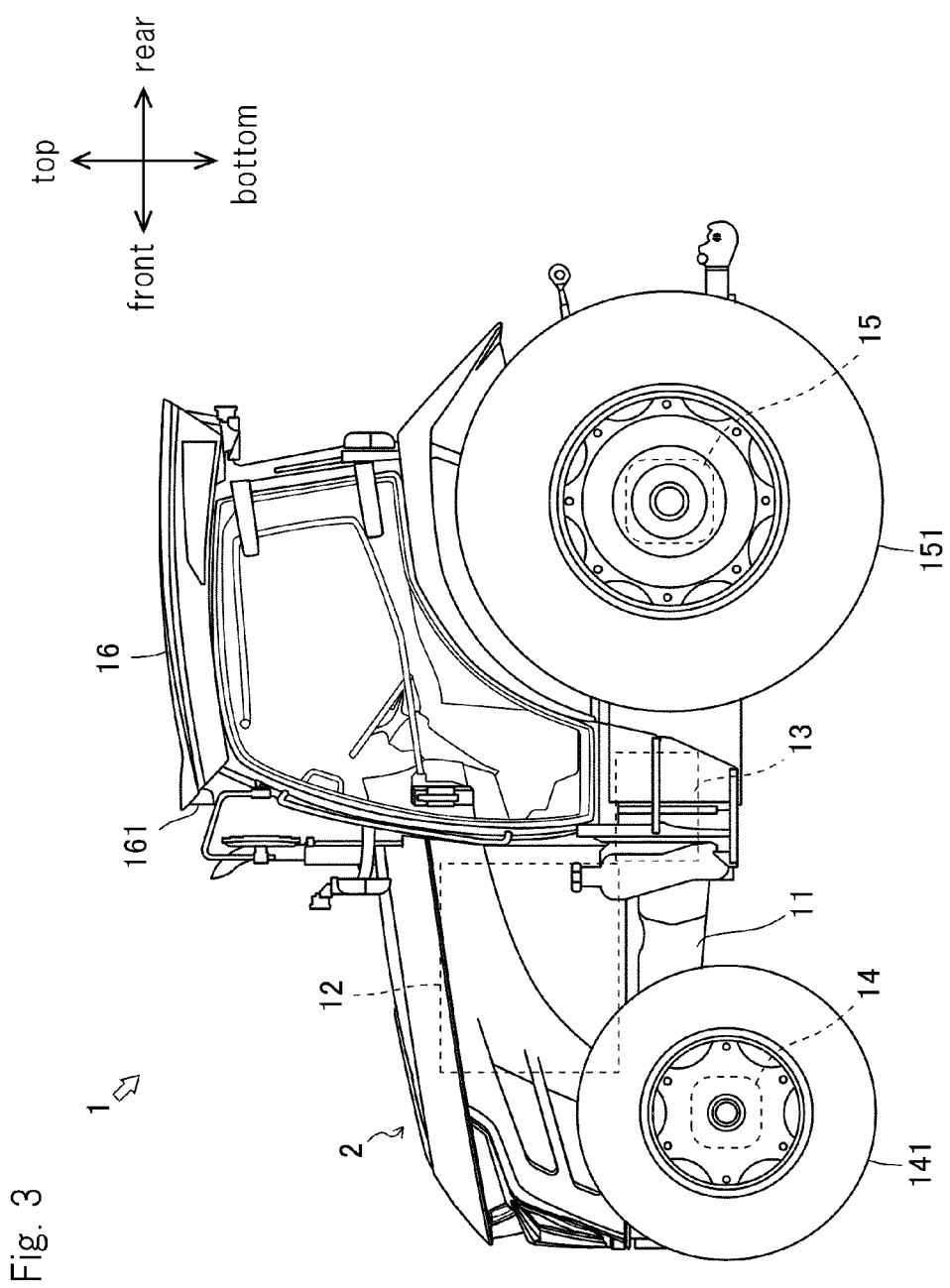
FIG. 3 is a drawing from a direction of an arrow Y in FIG. 1.
Figure 4:
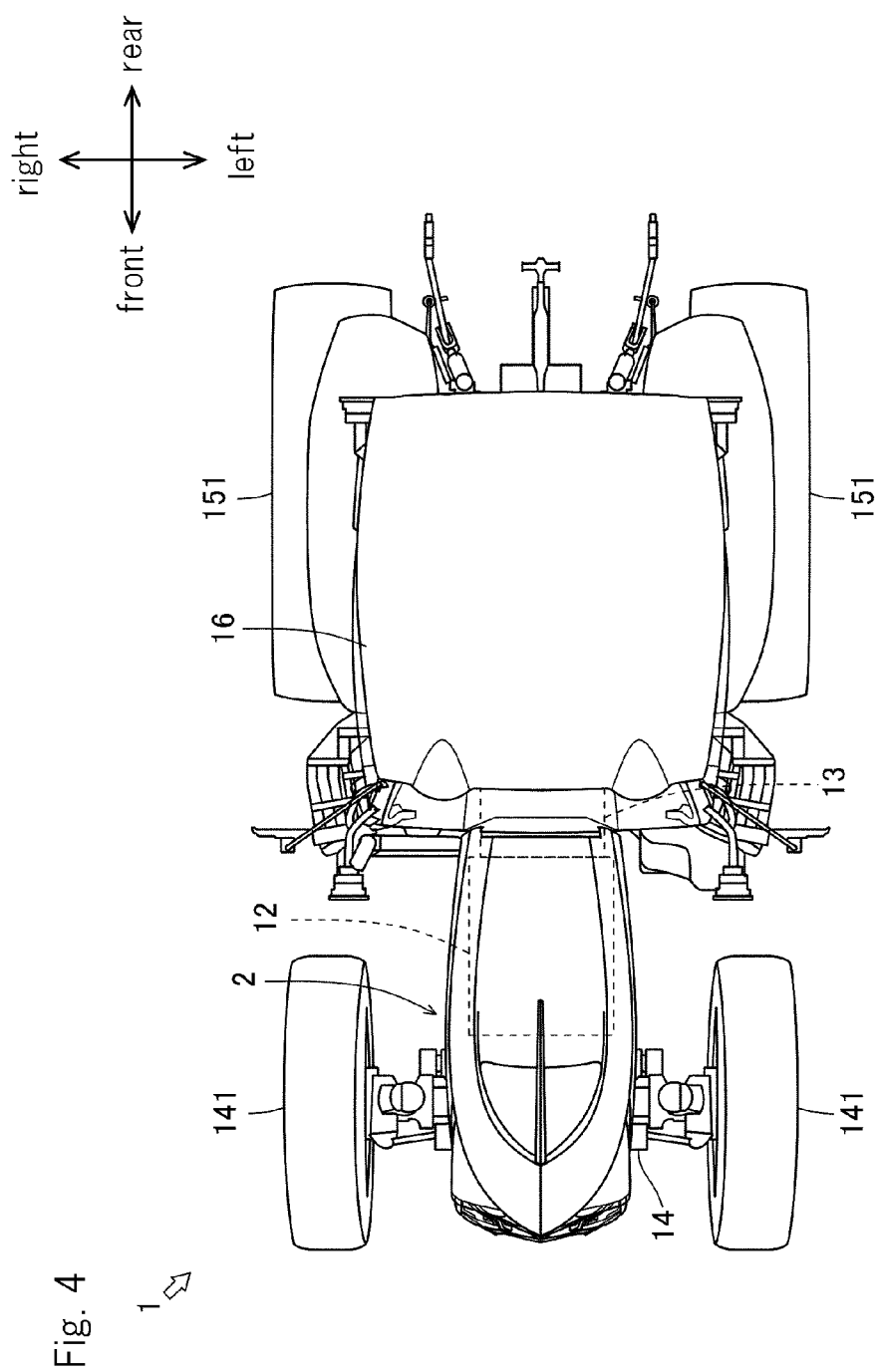
FIG. 4 is a drawing from a direction of an arrow Z in FIG. 1.

FIG. 1 shows the tractor 1. FIG. 2 is a drawing from a direction of an arrow X in FIG. 1, and FIG. 3 is a drawing from a direction of an arrow Y in FIG. 1. Furthermore, FIG. 4 is a drawing from a direction of an arrow Z in FIG. 1. In the drawings, longitudinal, lateral and vertical directions of the tractor 1 are shown.

The tractor 1 includes mainly a chassis frame 11, an engine 12, a transmission 13, a front axle 14 and a rear axle 15. In the tractor 1, in addition to a cabin 16 which protects an operator from a rainstorm, a bonnet 2 which protects the engine 12 from a rainstorm is provided.

The chassis frame 11 constitutes a frame of the tractor 1. The engine 12 and the like explained below are attached to the chassis frame 11.

The engine 12 exchanges heat energy obtained by combustion of fuel into kinetic energy. Namely, the engine 12 generates rotation power by making the fuel burn. When an operator operates an accelerator pedal, driving state of the engine 12 is changed corresponding to the operation.

The transmission 13 transmits the rotation power of the engine 12 to the front axle 14 and the rear axle 15. The rotation power of the engine 12 is inputted to the transmission 13 via a connection mechanism. The transmission 13 has a hydraulic-mechanical type stepless transmission (HMT or iHMT). When an operator operates a shift lever, operation state of the stepless transmission is changed corresponding to the operation.

The front axle 14 transmits the rotation power of the engine 12 to front wheels 141. The rotation power of the engine 12 is inputted to the front axle 14 via the transmission 13. The front axle 14 is juxtaposed with a steering device.

When an operator operates a steering wheel, the steering device changes a steering angle of the front wheels 141 corresponding to the operation.

The rear axle 15 transmits the rotation power of the engine 12 to rear wheels 151. The rotation power of the engine 12 is inputted to the rear axle 15 via the transmission 13. A PTO output device is provided in the rear axle 15. The PTO output device inputs the rotation power to a led work machine.

Next, the bonnet 2 is explained.

Figure 5:
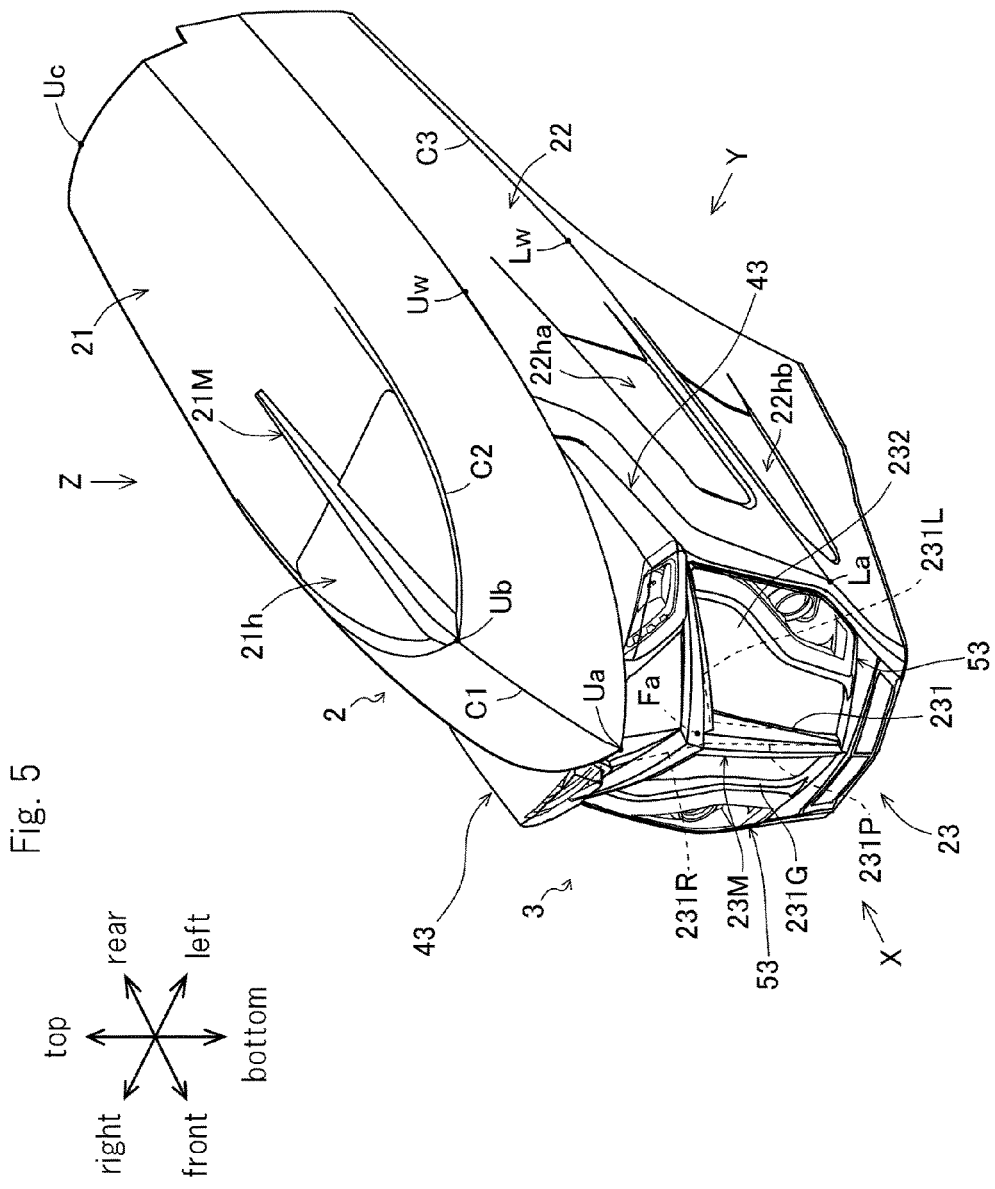
FIG. 5 is a drawing of a bonnet.
Figure 6:
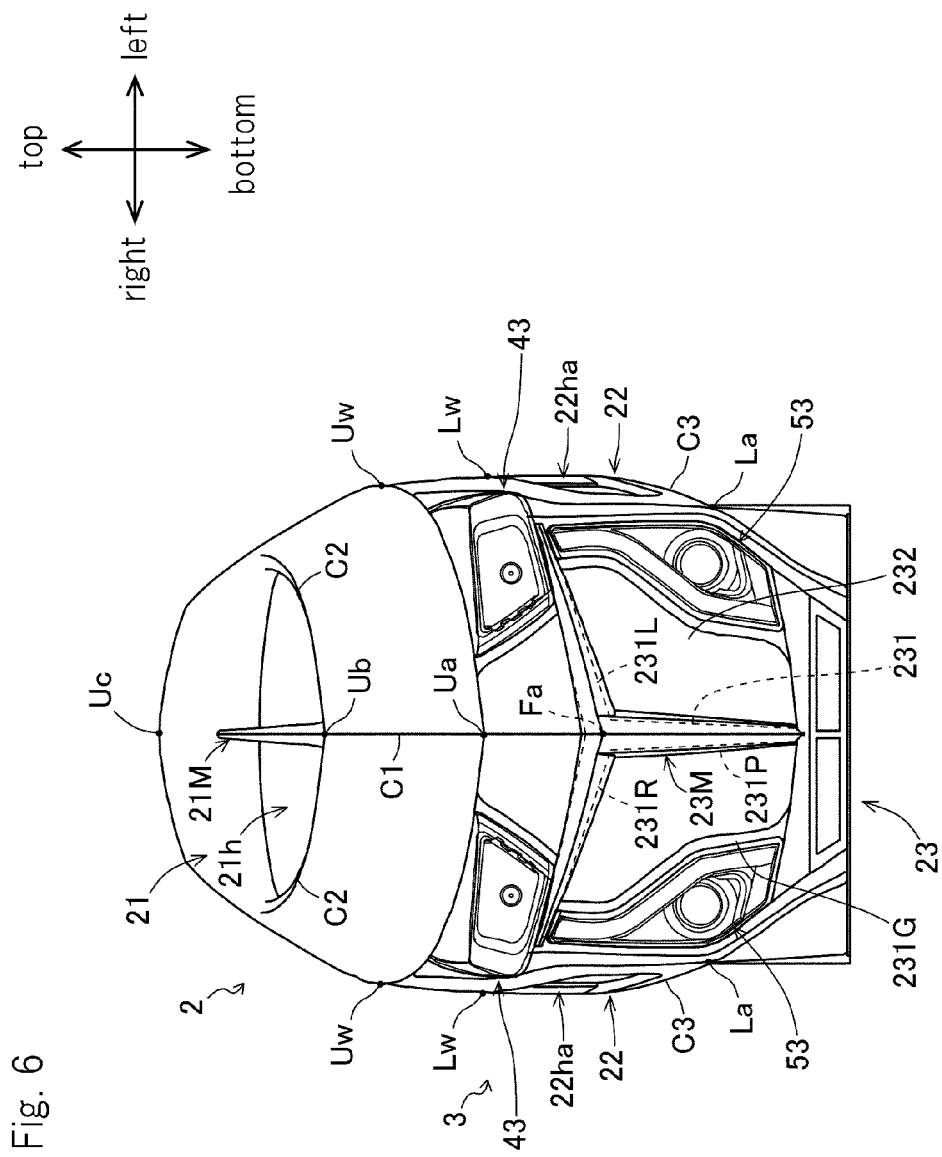
FIG. 6 is a drawing from a direction of an arrow X in FIG. 5.
Figure 7:
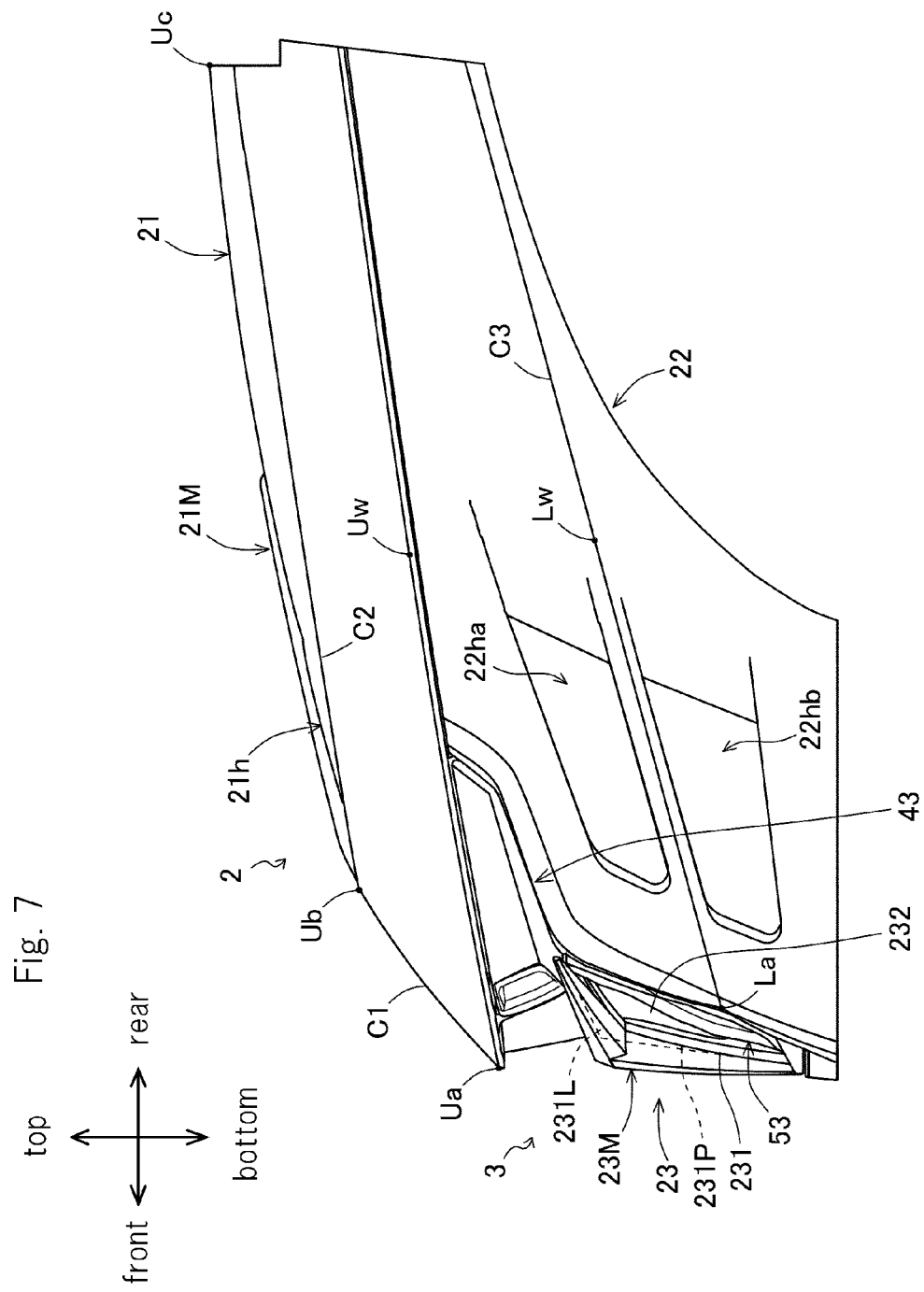
FIG. 7 is a drawing from a direction of an arrow Y in FIG. 5.
Figure 8:
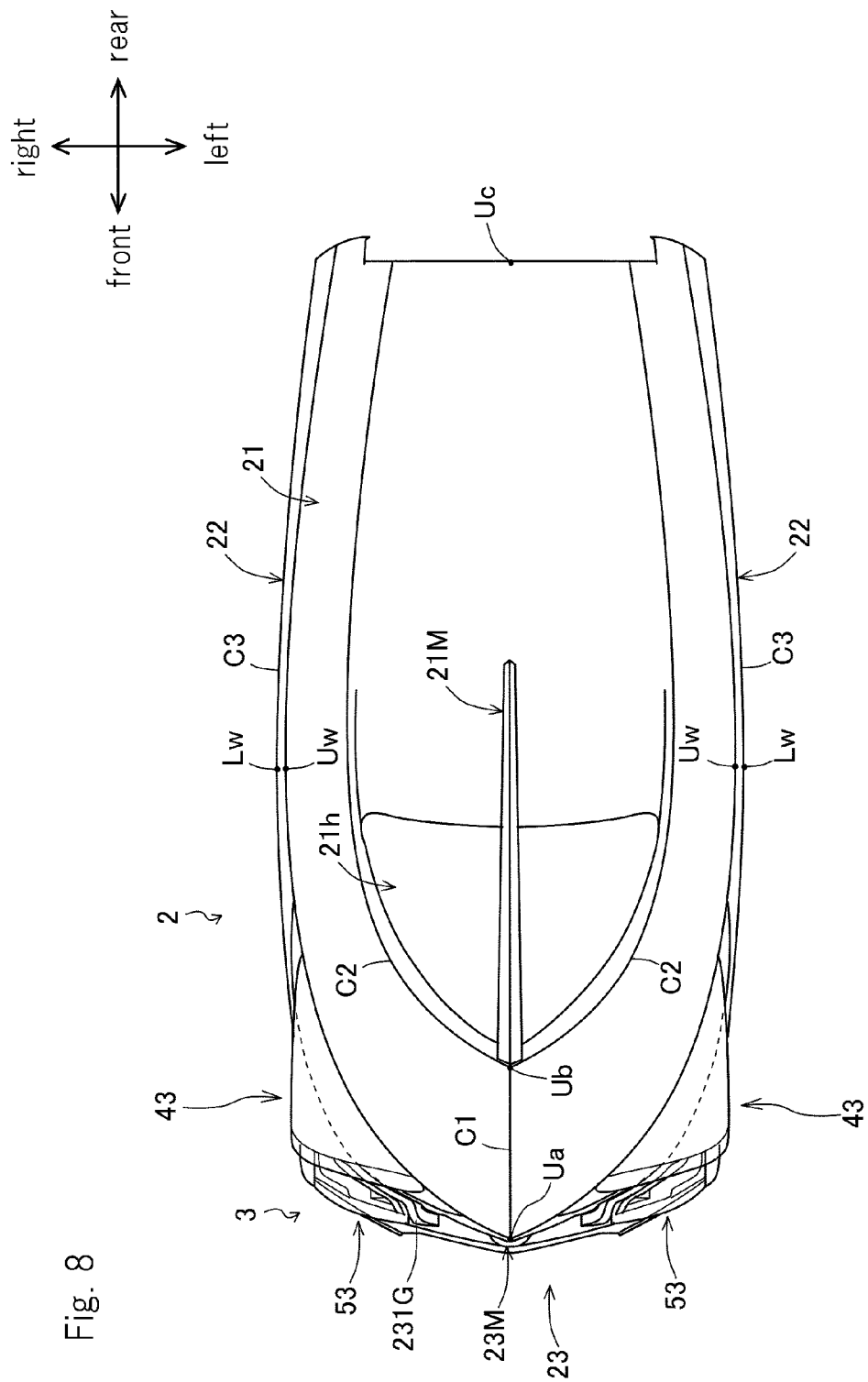
FIG. 8 is a drawing from a direction of an arrow Z in FIG. 5.

FIG. 5 shows the bonnet 2. FIG. 6 is a drawing from a direction of an arrow X in FIG. 5, and FIG. 7 is a drawing from a direction of an arrow Y in FIG. 5. Furthermore, FIG. 8 is a drawing from a direction of an arrow Z in FIG. 5. In the drawings, the longitudinal, lateral and vertical directions of the tractor 1 are shown.

The bonnet 2 includes mainly an upper cover 21, a lower cover 22 and a front grill 23. A headlight device 3 illuminating the front at night is provided in the bonnet 2.

The upper cover 21 is an exterior member covering an upper part of the engine 12. The upper cover 21 rises up from a front end point Ua thereof and is bent downward from a middle point Ub. Behind a vent hole 21h, the upper cover 21 curves gradually to a rear end point Uc. Furthermore, the upper cover 21 expands sideward from the front end point Ua and curves gradually so that side end points Uw are maximum width points. In the upper cover 21, a character line C1 is formed from the front end point Ua to the middle point Ub, and character lines C2 are formed from the middle point Ub so as to expand sideward. The vent hole 21h is formed substantially wedge-like between the two character lines C2.

The lower cover 22 is an exterior member covering a side part of the engine 12. The lower cover 22 expands sideward from a front end point La thereof and curves gradually so that side end points Lw are maximum width points. Furthermore, whereas an upper half part of the lower cover 22 is based on a curved surface expanded outward, a lower half part of the lower cover 22 is based on a curved surface depressed inward. In the lower cover 22, character lines C3 which pass from the front end point La through the side end points Lw are formed. Vent holes 22ha are formed substantially lozenge-like above the character lines C3, and vent holes 22hb are formed substantially lozenge-like below the character lines C3. An upper front part of the lower cover 22 is formed corresponding to a shape of a high-beam lamp lens 43 discussed later. Since the shape of the high-beam lamp lens 43 hangs aslant, the shape of the upper front part of the lower cover 22 also hangs aslant.

The front grill 23 is an exterior member covering a front part of the engine 12. The front grill 23 has a structure in which a metal mesh 232 is stuck on a support column 231. The support column 231 has beam parts 231L and 231R extended upward aslant from a center point Fa thereof and a pillar part 231P extended downward from the center point Fa. The beam parts 231L and 231R and the pillar part 231P become thin gradually as they separate from the center point Fa, and are connected to a grill frame 231G. The metal mesh 232 covers three parts which includes a range surrounded by the beam parts 231L and 231R and the grill frame 231G, a range surrounded by the beam part 231L, the pillar part 231P and the grill frame 231G, and a range surrounded by the beam part 231R, the pillar part 231P and the grill frame 231G. In addition, both sides of an upper part of the front grill 23 are formed corresponding to the shape of the high-beam lamp lens 43 discussed later. Since the shape of the high-beam lamp lens 43 hangs aslant, the shapes of the sides of an upper part of the front grill 23 also hang aslant.

Furthermore, the bonnet 2 has below features. A center mark 21M which is substantially I-like shaped is attached to an upper part of the upper cover 21 so as to cross the vent hole 21h. The center mark 21M is a sighting device for an operator to determine a traveling direction. A symbol mark 23M which is substantially Y-like shaped is attached to a front surface of the support column 231 so as to cover the beam parts 231L and 231R and the pillar part 231P. The symbol mark 23M is a design which symbolizes a supplier maker. Glossy plating is applied to the center mark 21M and the symbol mark 23M so as to make a strong impression on a third person.

Next, the headlight device 3 is explained in detail.

Figure 9:
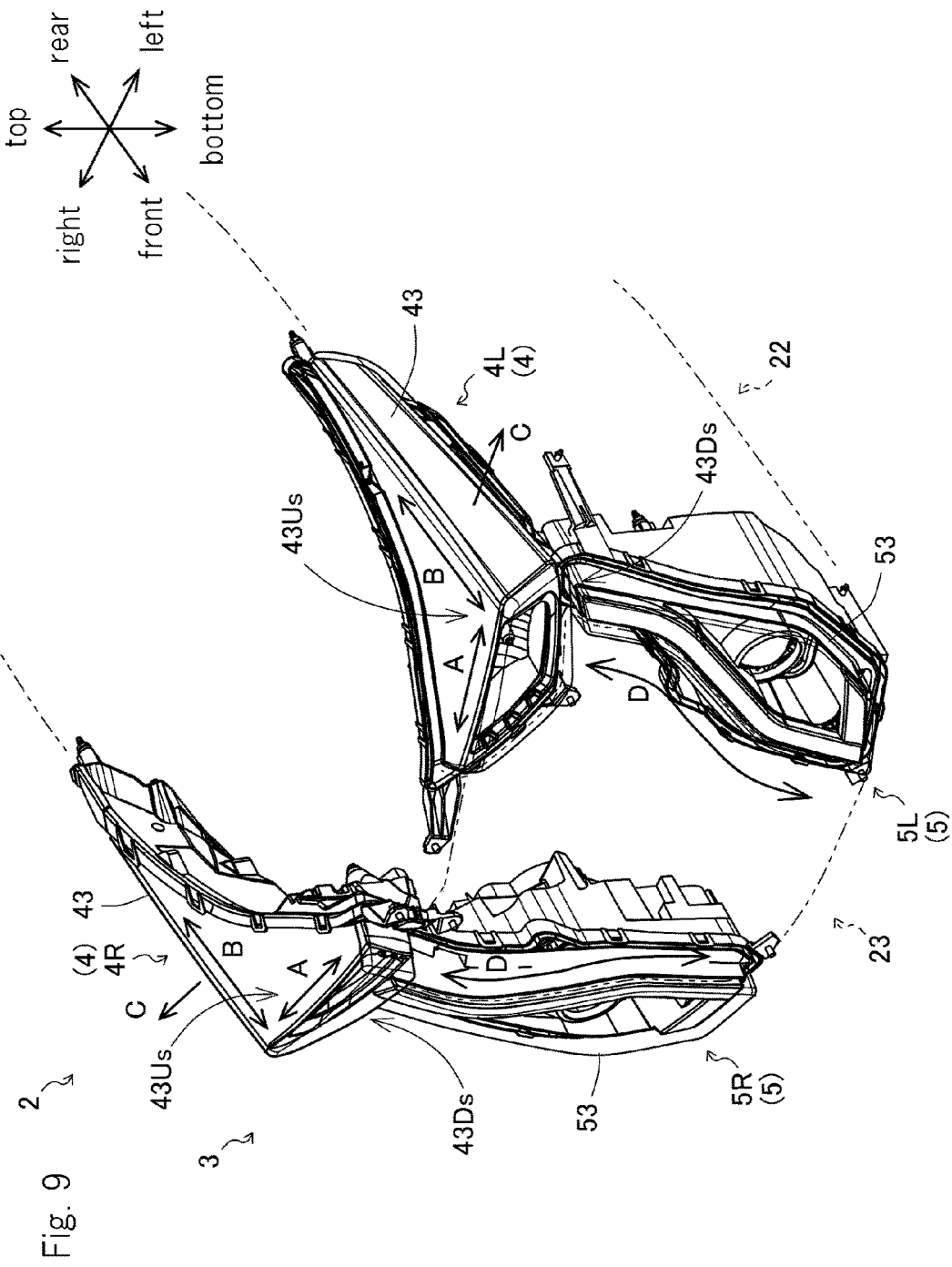
FIG. 9 is a drawing of a headlight device.

FIG. 9 is shows the headlight device 3. In the drawing, the longitudinal, lateral and vertical directions of the tractor 1 are shown.

The headlight device 3 includes mainly a pair of high-beam units 4L and 4R and a pair of low-beam units 5L and 5R. The high-beam units 4L and 4R and the low-beam units 5L and 5R are arranged respectively at upper and lower sides.

According to the configuration, in the tractor 1 having the headlight device 3, an illumination part in a front surface of the bonnet 2 (a part which can emit light: see FIGS. 12 and 15) has upper and lower two stages. Accordingly, the tractor 1 can make a strong impression on a third person so as to improve visibility.

When the high-beam unit 4L and the low-beam unit 5L are fixed to predetermined positions of the bonnet 2, they constitute a design having one light unit. Namely, the high-beam unit 4L and the low-beam unit 5L are combined so as to constitute the design in which they are connected integrally.

Similarly, when the high-beam unit 4R and the low-beam unit 5R are fixed to predetermined positions of the bonnet 2, they constitute a design having one light unit. Namely, the high-beam unit 4R and the low-beam unit 5R are combined so as to constitute the design in which they are connected integrally.

Next, the high-beam units 4L and 4R are explained in detail. Below explanation pays attention to the left high-beam unit 4L. For simplification, it is referred to as "high-beam unit 4".

Figure 10:
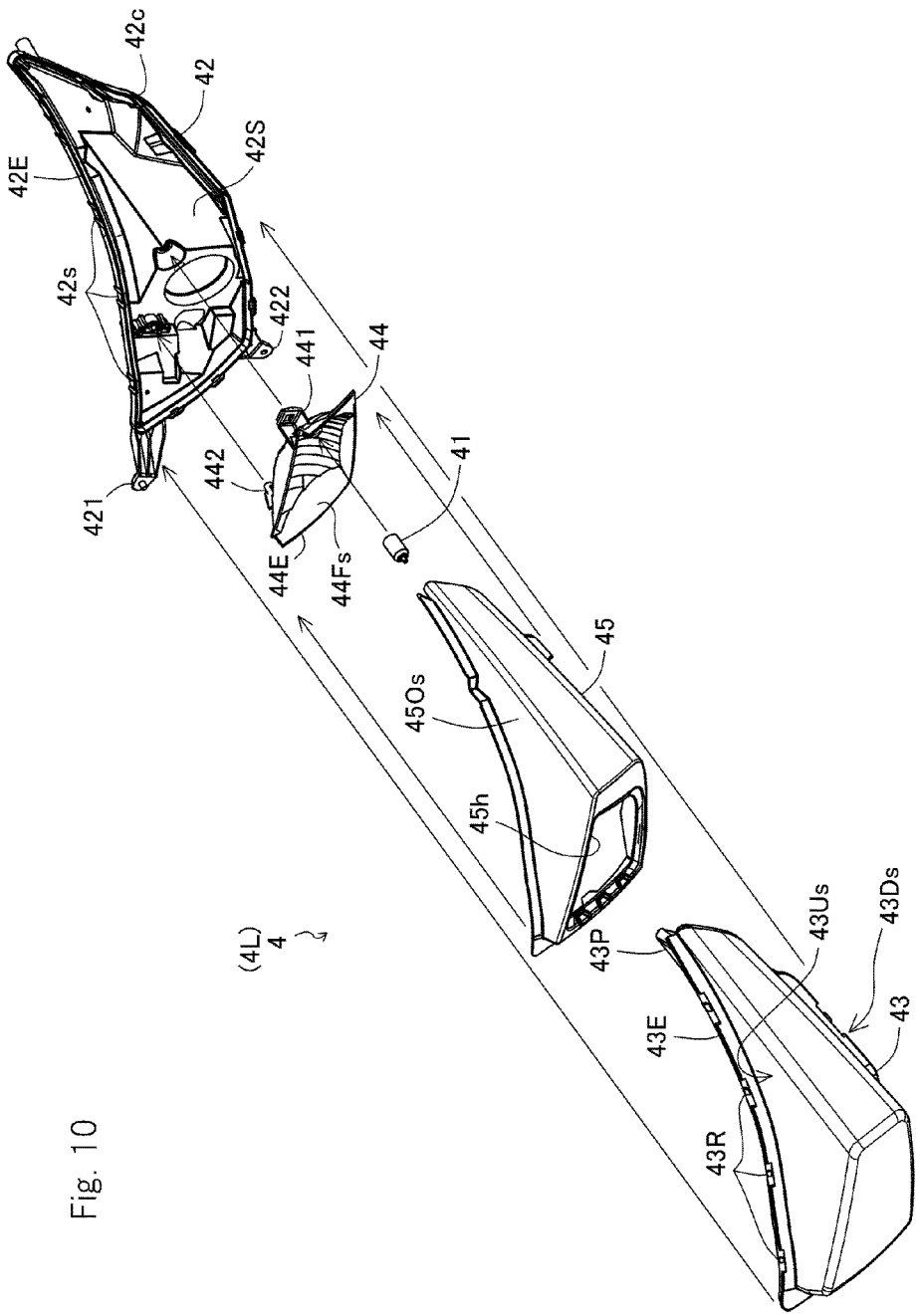
FIG. 10 is a drawing of a structure of the high-beam unit.
Figure 11:
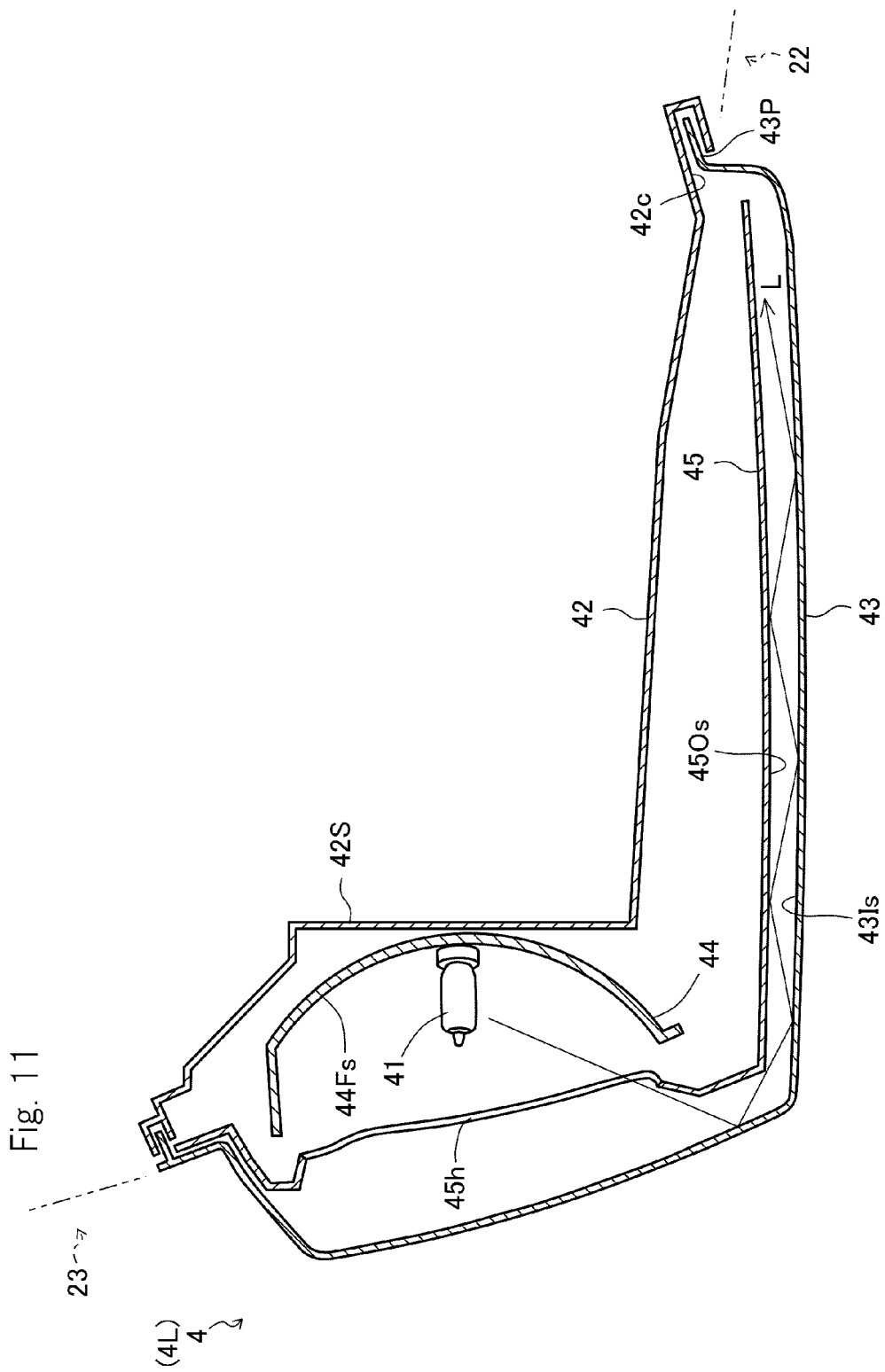
FIG. 11 is a drawing of a section of the high-beam unit.
Figure 12:
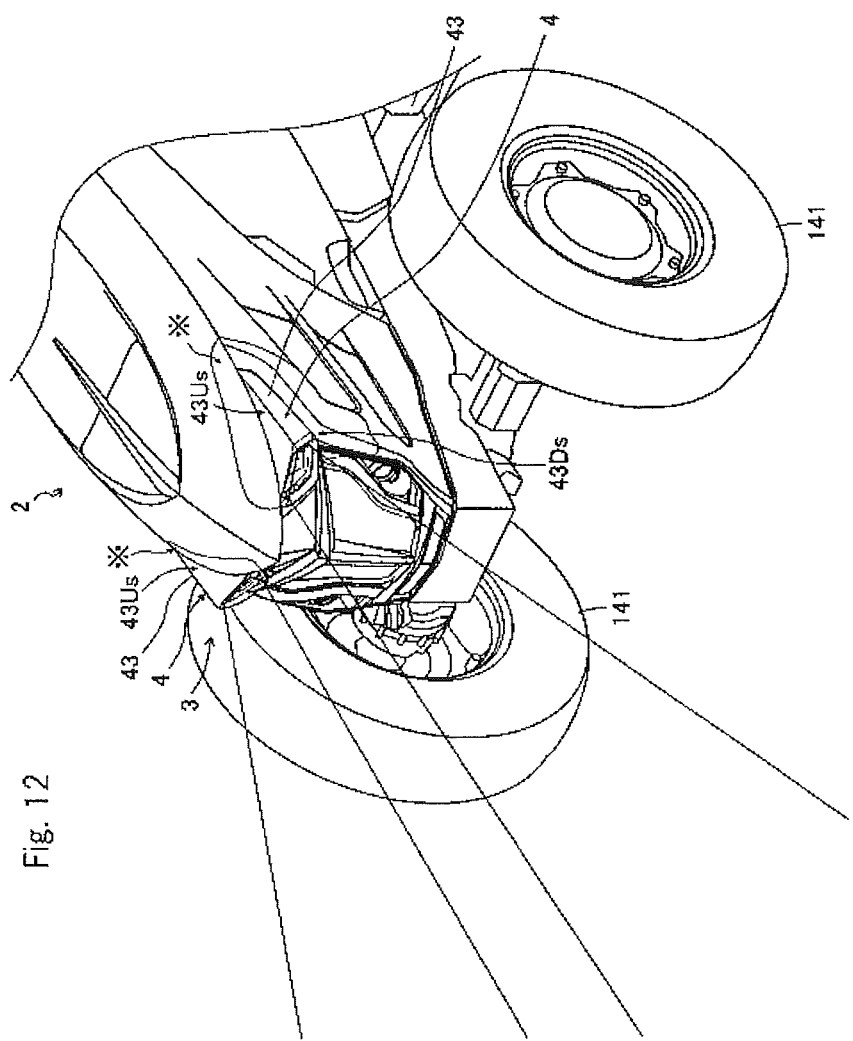
FIG. 12 is a drawing of a state in which the high-beam unit illuminates the front.

FIG. 10 shows a structure of the high-beam unit 4. FIG. 11 shows a section of the high-beam unit 4. FIG. 12 shows a state in which the high-beam unit 4 illuminates the front.

The high-beam unit 4 includes mainly a high-beam lamp 41, a high-beam lamp housing 42 and a high-beam lamp lens 43.

The high-beam lamp 41 is a so-called halogen lamp. The halogen lamp emits light by using a halogen cycle. The halogen lamp has features of being bright and excelling in durability.

The high-beam lamp housing 42 supports the high-beam lamp 41. Concretely, a stand 42S provided in a center part of the high-beam lamp housing 42 supports the high-beam lamp 41. In an outer edge part 42E of the high-beam lamp housing 42, a plurality of slits 42s are formed. On the slits 42s, lock pins 43R of the high-beam lamp lens 43 are hooked. In the outer edge part 42E of the high-beam lamp housing 42, brackets 421 and 422 are provided. The high-beam lamp housing 42 is fixed via the bracket 421 to the beam part 231L of the support column 231. The high-beam lamp housing 42 is fixed via the bracket 422 to the grill frame 231G of the support column 231.

The high-beam lamp lens 43 covers the high-beam lamp 41. Concretely, the high-beam lamp lens 43 is combined with the high-beam lamp housing 42 while the high-beam lamp 41 is housed in the high-beam lamp lens 43 so as to cover the high-beam lamp 41. In an outer edge part 43E of the high-beam lamp lens 43, the plurality of the lock pins 43R are formed. The lock pins 43R are hooked on the slits 42s of the high-beam lamp housing 42. In the outer edge part 43E of the high-beam lamp lens 43, a projecting plate 43P is provided. The high-beam lamp lens 43 is fixed while the projecting plate 43P is inserted into a recessed groove 42c of the high-beam lamp housing 42. Accordingly, dust and water are prevented from entering the inside.

Characteristics of the high-beam unit 4 are explained below.

The high-beam lamp lens 43 is formed from the front surface to a side surface of the bonnet 2 (see arrows A and B of FIG. 9). Namely, the high-beam lamp lens 43 configures not only the front surface of the bonnet 2 but also the side surface of the bonnet 2 (see FIGS. 5, 6 and 7).

Accordingly, in the tractor 1 having the headlight device 3, an illumination part (a part which can emit light: see FIG. 12) which is extended laterally can be secured from the front surface to the side surface of the bonnet 2. Therefore, the tractor can make a strong impression on a third person so as to improve visibility.

Furthermore, the high-beam lamp lens 43 is formed so as to be projected from the side surface of the bonnet 2 (see an arrow C of FIG. 9). Namely, the high-beam lamp lens 43 is not formed along the lower cover 22 but projected outward from the lower cover 22 (see FIGS. 5, 6 and 8).

Accordingly, the tractor 1 having the headlight device 3 can illuminate by light emitted from an upper surface 43Us and a lower surface 43Ds of the high-beam lamp lens 43 (see parts signed by  in FIG. 12). Therefore, the tractor 1 can make a strong impression on a third person so as to improve visibility.

Additionally, the high-beam unit 4 has a reflector 44 and an inner casing 45.

The reflector 44 reflects light of the high-beam lamp 41. Concretely, the reflector 44 surrounds the high-beam lamp 41 from a center to an outer edge part 44E thereof so as to reflect the light of the high-beam lamp 41. In a rear surface of the reflector 44, brackets 441 and 442 are provided. The reflector 44 is fixed via the brackets 441 and 442 to the stand 42S of the high-beam lamp housing 42. Glossy plating is applied to a front surface 44Fs of the reflector 44. Accordingly, reflectance of the light is improved.

The inner casing 45 covers the reflector 44. Concretely, the inner casing 45 is combined with the high-beam lamp housing 42 while the reflector 44 is housed in the inner casing 45 so as to cover the reflector 44. In a predetermined position of the inner casing 45, a substantially lozenge-like opening 45h is provided. The inner casing 45 is fixed so that the opening 45h is arranged inside the outer edge part 44E of the reflector 44. Glossy plating is applied to an outer surface 45Os of the inner casing 45. Accordingly, reflectance of the light is improved.

Other characteristics of the high-beam unit 4 are explained below.

The inner casing 45 is projected from the side surface of the bonnet 2 and formed along an inner surface 43Is of the high-beam lamp lens 43 (see the arrow C of FIG. 9). Namely, the inner casing 45 is projected outward from the lower cover 22 and is separated from the inner surface 43Is of the high-beam lamp lens 43 for a fixed interval. Accordingly, the light of the high-beam lamp 41 passes between the outer surface 45Os of the inner casing 45 and the inner surface 43Is of the high-beam lamp lens 43 and reaches an end of the high-beam lamp lens 43 (see an arrow L of FIG. 11).

Accordingly, in the tractor 1 having the headlight device 3, the high-beam lamp lens 43 constituting the side surface of the bonnet 2 can be made bright substantially uniformly (see FIG. 12). Therefore, the tractor 1 can make a strong impression on a third person so as to improve visibility.

Furthermore, as mentioned above, in the inner casing 45, glossy plating is applied to the outer surface 45Os opposite to the high-beam lamp lens 43. Concretely, chromium plating is applied. Accordingly, the light of the high-beam lamp 41 is hard to decline even when reflected by the outer surface 45Os of the inner casing 45 and reaches the end of the high-beam lamp lens 43 certainly. Accordingly, the whole high-beam lamp lens 43 is made bright.

Accordingly, in the tractor 1 having the headlight device 3, the high-beam lamp lens 43 constituting the side surface of the bonnet 2 can be made bright substantially uniformly further (see FIG. 12). Therefore, the tractor 1 can make a strong impression on a third person so as to improve visibility.

Next, the low-beam units 5L and 5R are explained in detail. Below explanation pays attention to the left low-beam unit 5L. For simplification, it is referred to as "low-beam unit 5".

Figure 13:
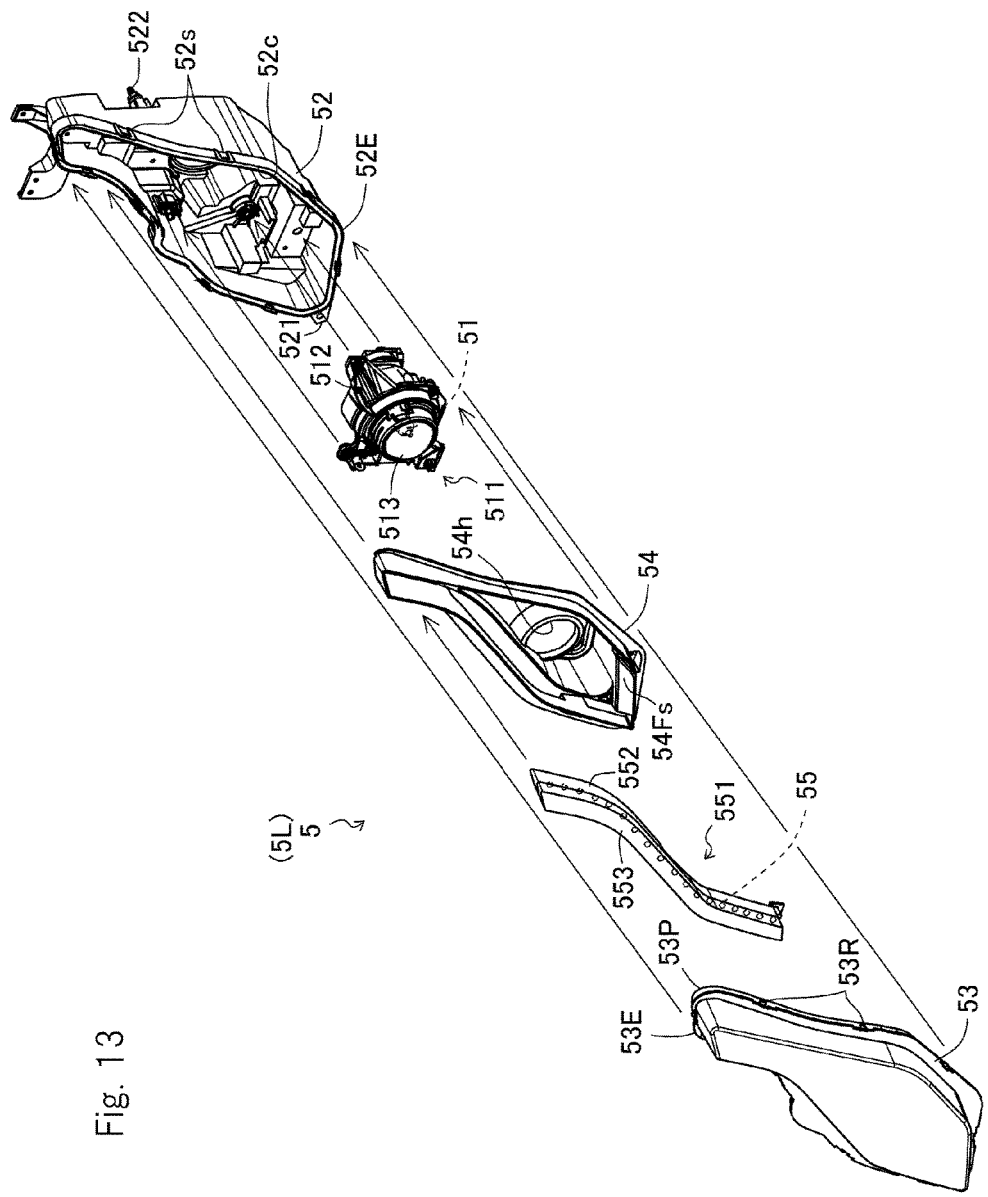
FIG. 13 is a drawing of a structure of the low-beam unit.
Figure 14:
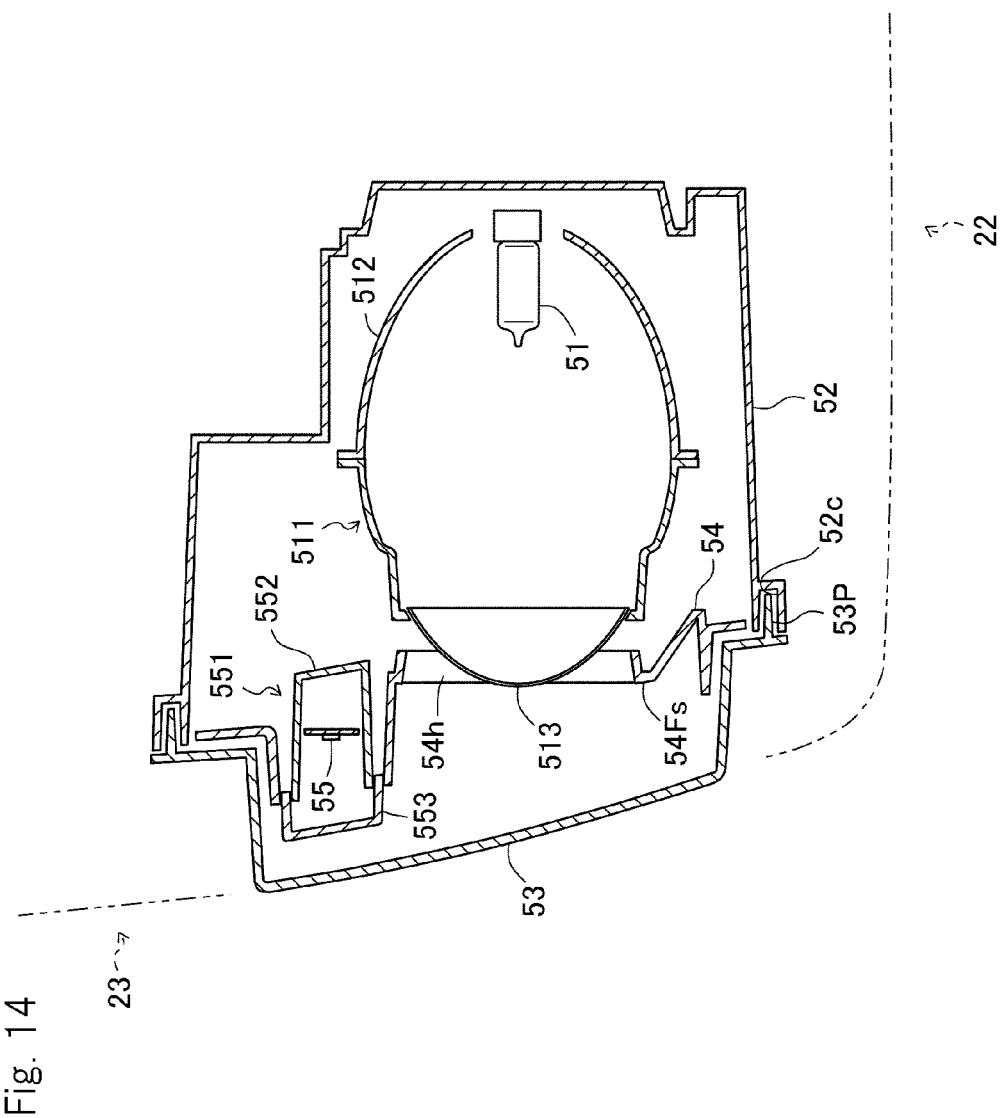
FIG. 14 is a drawing of a section of the low-beam unit.
Figure 15:
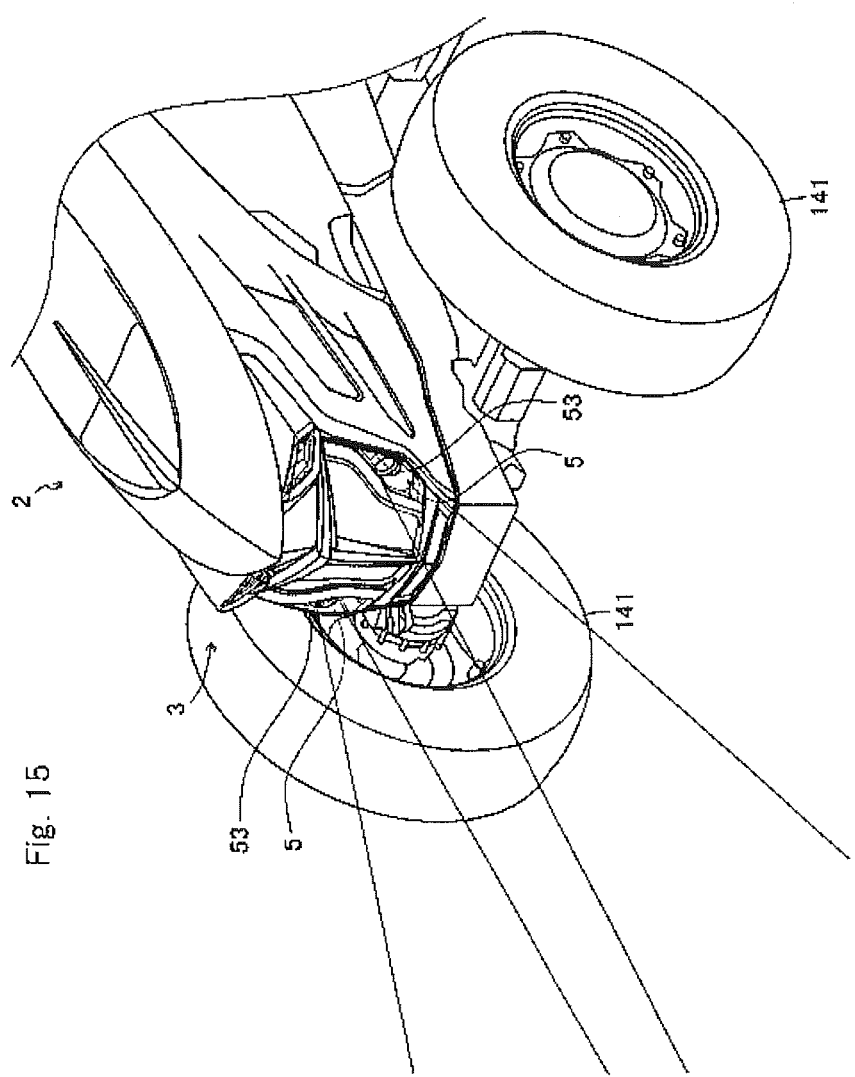
FIG. 15 is a drawing of a state in which the low-beam unit illuminates the front.

FIG. 13 shows a structure of the low-beam unit 5. FIG. 14 shows a section of the low-beam unit 5. FIG. 15 shows a state in which the low-beam unit 5 illuminates the front.

The low-beam unit 5 includes mainly a low-beam lamp 51, a low-beam lamp housing 52 and a low-beam lamp lens 53.

The low-beam lamp 51 is a so-called halogen lamp. The halogen lamp emits light by using a halogen cycle. The halogen lamp has features of being bright and excelling in durability. The low-beam lamp 51 is housed in a projector unit 511. The projector unit 511 includes a reflector 512 and a lens 513. The lens 513 converges light of the low-beam lamp 51 so that the light with high directivity is emitted (the light hard to be diffused is emitted) from the lens 513. However, the lens 513 may be omitted.

The low-beam lamp housing 52 supports the low-beam lamp 51. Concretely, the projector unit 511 is fixed to a center part of the low-beam lamp housing 52 so as to support the low-beam lamp 51. In an outer edge part 52E of the low-beam lamp housing 52, a plurality of slits 52s are formed. On the slits 52s, lock pins 53R of the low-beam lamp lens 53 are hooked. In the outer edge part 52E of the low-beam lamp housing 52, brackets 521 and 522 are provided. The low-beam lamp housing 52 is fixed via the bracket 521 to the grill frame 231G of the support column 231. The low-beam lamp housing 52 is fixed via the bracket 522 to the lower cover 22.

The low-beam lamp lens 53 covers the low-beam lamp 51. Concretely, the low-beam lamp lens 53 is combined with the low-beam lamp housing 52 while the projector unit 511 is housed in the low-beam lamp housing 52 so as to cover the low-beam lamp 51. In an outer edge part 53E of the low-beam lamp lens 53, the plurality of the lock pins 53R are formed. The lock pins 53R are hooked on the slits 52s of the low-beam lamp housing 52. In the outer edge part 53E of the low-beam lamp lens 53, a projecting plate 53P is provided. The low-beam lamp lens 53 is fixed while the projecting plate 53P is inserted into a recessed groove 52c of the low-beam lamp housing 52. Accordingly, dust and water are prevented from entering the inside.

Characteristics of the low-beam unit 5 are explained below.

The low-beam lamp lens 53 is formed along the front grill 23 below the high-beam unit 4 (see an arrow D of FIG. 9). Namely, the low-beam lamp lens 53 is arranged below the high-beam lamp lens 43 while being engaged with the front grill 23 (see FIGS. 5 and 6).

Accordingly, in the tractor 1 having the headlight device 3, an illumination part (a part which can emit light: see FIG. 15) which is extended longitudinally can be secured below the high-beam unit 4. Therefore, the tractor 1 can make a strong impression on a third person so as to improve visibility.

Additionally, the low-beam unit 5 has an inner plate 54 and an illumination lamp 55.

The inner plate 54 covers the projector unit 511. Concretely, the inner plate 54 is combined with the low-beam lamp housing 52 while the projector unit 511 is housed in the low-beam lamp housing 52 so as to cover the projector unit 511. In a predetermined position of the inner plate 54, a circular opening 54h is provided. The inner plate 54 is fixed by engaging the lens 513 of the projector unit 511 with the opening 54h. Glossy plating is applied to a front surface 54Fs of the inner plate 54. Accordingly, reflectance of the light is improved.

The illumination lamp 55 is a so-called LED light emitting diode. The LED light emitting diode emits light using an electroluminescence effect. The LED light emitting diode has features of being bright and excelling in durability. In the low-beam unit 5, total 18 illumination lamps 55 are arranged along an outline of an inner end side of the low-beam lamp lens 53. The illumination lamps 55 are housed in a highlight unit 551. The highlight unit 551 includes a mount 552 and a cover 553. Since the cover 553 irregularly reflects light of the LED light emitting diodes, it seems that the cover 553 emits light uniformly (it seems that surface light emission is performed). However, the cover 553 may be omitted.

Other characteristics of the low-beam unit 5 are explained below.

The illumination lamp 55 highlights a zone along an outline of the low-beam lamp lens 53. Namely, the illumination lamp 55 illuminates a fixed range along the outline of the low-beam lamp lens 53 line-like. "Illuminates line-like" includes the case in which a curved surface of light is drawn by the surface light emission of the cover 553 and the case in which a curved surface of light is drawn by light emission of the illumination lamps 55 arranged continuously.

Figure 16:
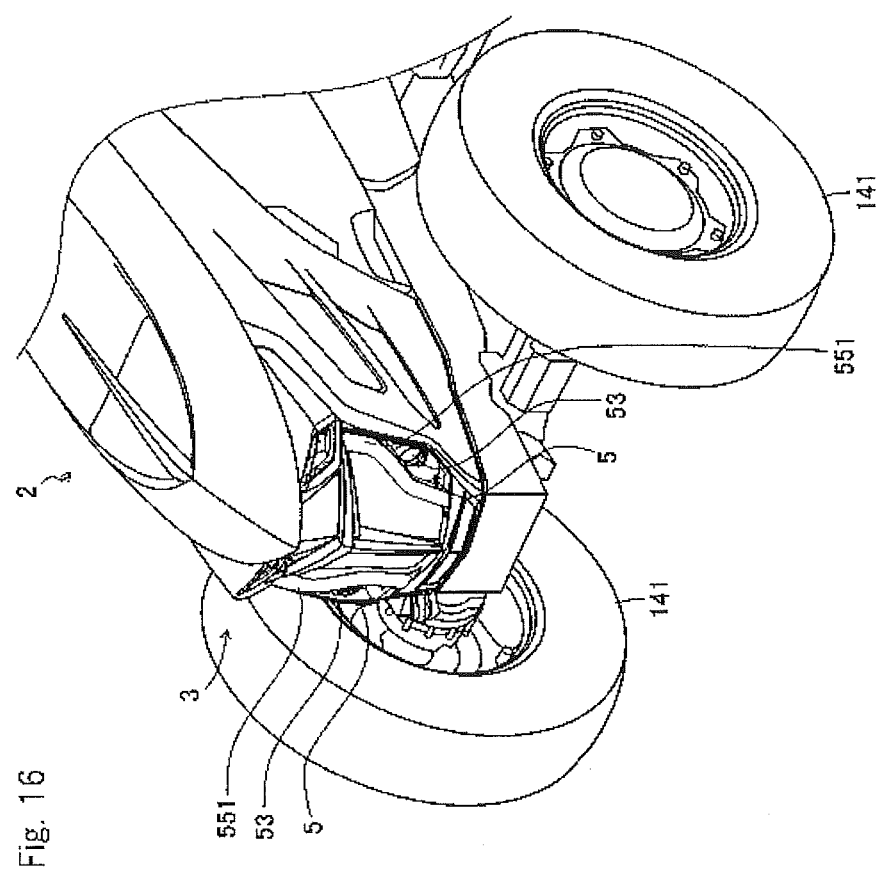

Accordingly, in the tractor 1 having the headlight device 3, the outline of the low-beam lamp lens 53 extended longitudinally can be emphasized (see FIG. 16). Therefore, the tractor 1 can make a strong impression on a third person so as to improve visibility.

Furthermore, the illumination lamps 55 are turned on following turning on of a work lamp 161 and turned off following turning off of the work lamp 161. Herein, the work lamp 161 illuminates the front side and surrounding thereof of the bonnet 2 at the time of working. In the tractor 1, the work lamp 161 is arranged in the cabin 16 (see FIGS. 1, 2 and 3).

Accordingly, in the tractor 1 having the headlight device 3, appearance of the low-beam lamp lens 53 is changed corresponding to a driving state. Therefore, the tractor 1 can make a strong impression on a third person so as to improve visibility.

Figure 17:
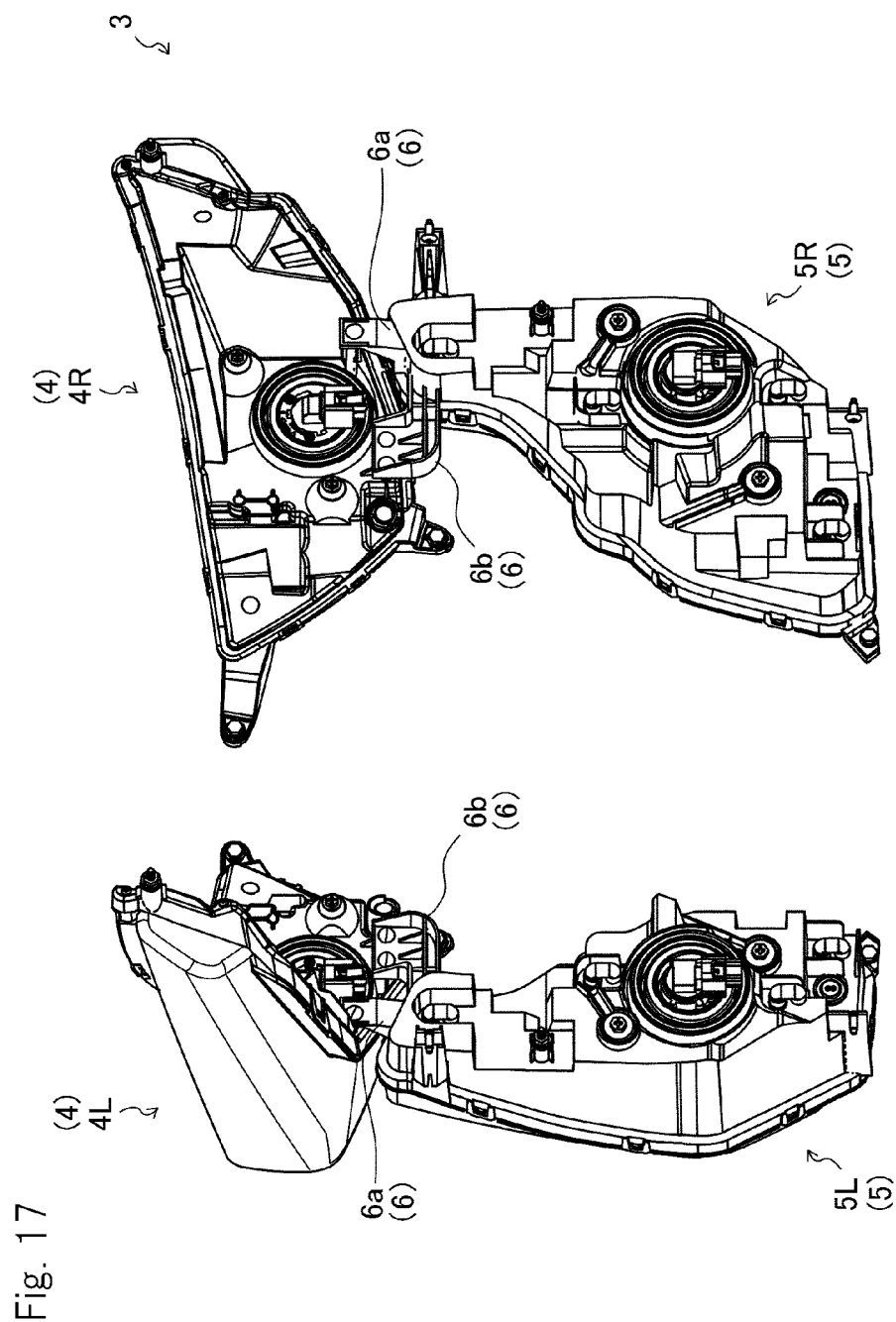
FIG. 17 is a drawing of a state in which the high-beam unit is connected to the low-beam unit.

The above is the explanation of the high-beam unit 4 and the low-beam unit 5 constituting the headlight device 3. The high-beam unit 4 and the low-beam unit 5 are connected to each other via a bracket 6 (see FIG. 17).

Accordingly, in the tractor 1 having the headlight device 3, the one high-beam unit 4 and the one low-beam unit 5 is configured integrally. Therefore, assembly processes of the tractor 1 can be simplified so as to improve production efficiency.

In the headlight device 3, the bracket 6 includes a first bracket 6a and a second bracket 6b. The first bracket 6a is projected upward from the low-beam lamp housing 52 and connected to the high-beam unit 4. The second bracket 6b is projected from the low-beam lamp housing 52 toward an inner end and connected to the high-beam unit 4. The first bracket 6a and the second bracket 6b are separated suitably so as to suppress shakiness.

Next, headlight devices 3S and 3T according to other embodiments are explained.

Figure 18:
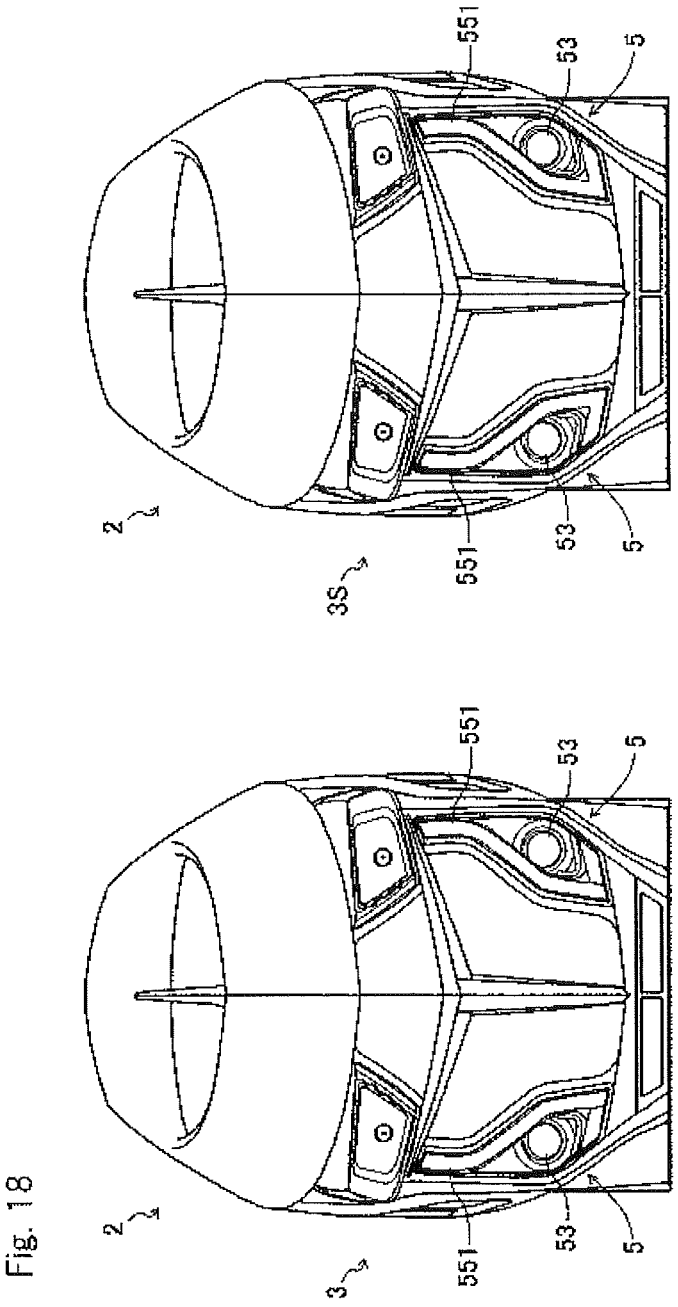
FIG. 18 is a drawing of a headlight device according to a second embodiment.

FIG. 18 shows the headlight device 3S according to a second embodiment. FIG. 19 shows the headlight device 3T according to a third embodiment. In each of the drawings, the headlight device 3 according to the first embodiment is shown for comparison.

In the low-beam unit 5 of the headlight device 3S, the plurality of the illumination lamps 55 are arranged along the outline at the sides of inner and lower ends of the low-beam lamp lens 53. Accordingly, the illumination lamps 55 highlight a zone along the outline at the sides of inner and lower ends of the low-beam lamp lens 53. Namely, the illumination lamp 55 illuminates a fixed range along the outline at the sides of inner and lower ends of the low-beam lamp lens 53 line-like.

Accordingly, in the tractor 1 having the headlight device 3S, the outline of the low-beam lamp lens 53 extended longitudinally can be emphasized. The design which emphasized the acute angle is obtained so as to bring a sharp impression. Therefore, the tractor 1 can make a strong impression on a third person so as to improve visibility.

In the low-beam unit 5 of the headlight device 3T, the plurality of the illumination lamps 55 are arranged so as to occupy an upper half of the low-beam lamp lens 53. Accordingly, the illumination lamps 55 highlight the upper half of the low-beam lamp lens 53. Namely, the illumination lamp 55 illuminates a range occupying the upper half of the low-beam lamp lens 53.

Accordingly, in the tractor 1 having the headlight device 3T, the outline of the low-beam lamp lens 53 extended longitudinally can be emphasized. The design which emphasized width of the illumination part is obtained so as to bring a gorgeous impression. Therefore, the tractor 1 can make a strong impression on a third person so as to improve visibility.

INDUSTRIAL APPLICABILITY

The present invention can be used for an art of a headlight device of a tractor.

DESCRIPTION OF NOTATIONS 1 tractor
6 bracket
11 chassis frame
12 engine
13 transmission
14 front axle 15 rear axle
16 cabin
2 bonnet
21 upper cover
22 lower cover
23 front grill
3 headlight device
4 high-beam unit
41 high-beam lamp
42 high-beam lamp housing
43 high-beam lamp lens
44 reflector
45 inner casing
5 low-beam unit
51 low-beam lamp
52 low-beam lamp housing
53 low-beam lamp lens
54 inner plate
55 illumination lamp

The invention claimed is:

1. A headlight device of a tractor comprising:
a pair of high-beam units; and
a pair of low-beam units,
characterized in that
the pair of high-beam units and the pair of low-beam units are arranged respectively at upper and lower sides,
wherein each of the high-beam units comprises:
a high-beam lamp;
a high-beam lamp housing supporting the high-beam lamp; and
a high-beam lamp lens covering the high-beam lamp, and
wherein the high-beam lamp lens is formed from a front surface to a side surface of a bonnet.

2. The headlight device of the tractor according to claim 1, wherein the high-beam lamp lens is formed so as to be projected from the side surface of the bonnet.

3. The headlight device of the tractor according to claim 2,
wherein each of the high-beam units further comprises:
a reflector reflecting light of the high-beam lamp; and
an inner casing covering the reflector, and
wherein the inner casing is projected from the side surface of the bonnet and formed along an inner surface of the high-beam lamp lens.

4. The headlight device of the tractor according to claim 3, wherein glossy plating is applied to an outer surface of the inner casing opposite to the high-beam lamp lens.

5. The headlight device of the tractor according to claim 4, wherein each of the high-beam units and each of the low-beam units are connected to each other via a bracket.

6. A tractor comprising:
the headlight device according to claim 4; and
a symbol mark arranged at a center of the headlight device.

7. The headlight device of the tractor according to claim 3, wherein each of the high-beam units and each of the low-beam units are connected to each other via a bracket.

8. A tractor comprising:
the headlight device according to claim 3; and
a symbol mark arranged at a center of the headlight device.

9. The headlight device of the tractor according to claim 2, wherein each of the high-beam units and each of the low-beam units are connected to each other via a bracket.

10. A tractor comprising:
the headlight device according to claim 2; and
a symbol mark arranged at a center of the headlight device.

11. The headlight device of the tractor according to claim 1, wherein each of the high-beam units and the each of the low-beam units are connected to each other via a bracket.

12. A tractor comprising:
the headlight device according to claim 1; and
a symbol mark arranged at a center of the headlight device.

13. A headlight device of a tractor comprising:
a pair of high-beam units; and
a pair of low-beam units,
characterized in that
the pair of high-beam units and the pair of low-beam units are arranged respectively at upper and lower sides,
wherein each of the low-beam units comprises:
a low-beam lamp;
a low-beam lamp housing supporting the low-beam lamp; and
a low-beam lamp lens covering the low-beam lamp, and
wherein the low-beam lamp lens is formed along a front grill below each of the high-beam units.

14. The headlight device of the tractor according to claim 13,
wherein each of the low-beam units has one or more illumination lamps, and
wherein the one or more illumination lamps highlights a zone along an outline of the low-beam lamp lens.

15. The headlight device of the tractor according to claim 14, wherein the one or more illumination lamps are turned on following turning on of a work lamp and turned off following turning off of the work lamp.

* * * * *